US008411686B2

(12) United States Patent
Wei

(10) Patent No.: US 8,411,686 B2
(45) Date of Patent: Apr. 2, 2013

(54) METHOD AND DEVICE FOR UPDATING A MULTIMEDIA BROADCAST CONDITIONAL ACCESS PLUG-IN

(75) Inventor: Fu Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 300 days.

(21) Appl. No.: 12/990,946

(22) PCT Filed: Apr. 21, 2009

(86) PCT No.: PCT/CN2009/071385
§ 371 (c)(1),
(2), (4) Date: Nov. 25, 2010

(87) PCT Pub. No.: WO2009/135409
PCT Pub. Date: Nov. 12, 2009

(65) Prior Publication Data
US 2011/0058509 A1 Mar. 10, 2011

(30) Foreign Application Priority Data

May 7, 2008 (CN) .......................... 2008 1 0094683

(51) Int. Cl.
*H04L 12/28* (2006.01)
*H04J 3/24* (2006.01)
*G06F 15/167* (2006.01)

(52) U.S. Cl. ........ 370/392; 370/390; 370/474; 370/535; 709/203; 709/217

(58) Field of Classification Search .................. 370/390, 370/392, 474, 535; 709/203, 217
See application file for complete search history.

(56) References Cited

U.S. PATENT DOCUMENTS

| 6,243,087 | B1 * | 6/2001 | Davis et al. .................... 715/723 |
| 7,154,910 | B2 * | 12/2006 | Bardini et al. ................. 370/474 |
| 7,487,534 | B1 | 2/2009 | Peterka et al. |
| 2001/0009423 | A1 * | 7/2001 | Davis et al. .................... 345/723 |
| 2002/0186847 | A1 | 12/2002 | Bischoff et al. |
| 2003/0127358 | A1 * | 7/2003 | Letzsch ........................... 208/75 |
| 2003/0217193 | A1 * | 11/2003 | Thurston et al. .............. 709/321 |
| 2004/0221302 | A1 | 11/2004 | Ansari et al. |

(Continued)

FOREIGN PATENT DOCUMENTS

| CN | 1487740 A | 4/2004 |
| CN | 1842155 A | 10/2006 |

(Continued)

OTHER PUBLICATIONS

Supplementary European Search Report in European application No. 09741684.6, mailed on Oct. 27, 2011.

(Continued)

*Primary Examiner* — Andrew Lee
(74) *Attorney, Agent, or Firm* — Oppedahl Patent Law Firm LLC

(57) ABSTRACT

A CA plug-in file is divided into file blocks and file pieces in turn, and the file pieces are encapsulated into service data packets and data units in turn; a frame header is encapsulated in a multiplexing frame after the value of a "plug-in update identification" field configured in the multiplexing frame header is set to be valid, and the data unit is encapsulated in a data segment of the multiplexing sub-frame; and the encapsulated multiplexing frame is modulated to an electromagnetic wave of a physical channel sent to the air.

10 Claims, 6 Drawing Sheets

U.S. PATENT DOCUMENTS

| | | | |
|---|---|---|---|
| 2004/0221324 A1 | 11/2004 | Ansari et al. | |
| 2006/0294250 A1* | 12/2006 | Stone et al. | 709/229 |
| 2007/0044087 A1 | 2/2007 | Kim et al. | |
| 2008/0181189 A1* | 7/2008 | Yoo | 370/338 |
| 2009/0276318 A1* | 11/2009 | Broadbent et al. | 705/14.64 |
| 2010/0146279 A1* | 6/2010 | Lu et al. | 713/172 |

FOREIGN PATENT DOCUMENTS

| | | | |
|---|---|---|---|
| CN | 1956585 A | 5/2007 | |
| CN | 1972408 A | 5/2007 | |
| CN | 101060661 A | 10/2007 | |
| CN | 101286809 A | 10/2008 | |
| EP | 1763162 A2 | 3/2007 | |
| EP | 1830569 A1 | 9/2007 | |
| WO | 0030346 A1 | 5/2000 | |
| WO | 2005048604 A1 | 5/2005 | |

OTHER PUBLICATIONS

Digital Video Broadcasting (DVB); Specification for System Software Update in DVB Systems.

International Search Report in international application No. PCT/CN2009/071385, mailed on Jul. 16, 2009.

English Translation of the Written Opinion of the International Search Authority in international application No. PCT/CN2009/071385, mailed on Jul. 16, 2009.

* cited by examiner

Fig.4

| multiplexing frame header | start code of the multiplexing frame | 32 |
| --- | --- | --- |
| | length of the multiplexing frame header | 8 |
| | protocol version number | 5 |
| | the minimum protocol version number | 5 |
| | multiplexing frame identification | 6 |
| | emergency broadcast instruction | 2 |
| | parameter instruction of next frame | 1 |
| | plug-in update identification | 3 |
| | indication of preact for updating sequence number of the control table | 2 |
| | renewal sequence number in the network message table | 4 |
| | renewal sequence number in the continuous services multiplexing configuration table | 4 |
| | renewal sequence number in the continuous services configuration table | 4 |
| | renewal sequence number in the short time services multiplexing configuration table | 4 |
| | renewal sequence number in the short time services configuration table | 4 |
| | ESG renewal sequence number | 4 |
| | renewal sequence number in extended control message | 4 |
| | number of multiplexing sub-frames | 4 |
| | length of multiplexing sub-frame 1 | 24 |
| | extended area | |
| | parameter of next frame | 40 |
| | CRC | 32 |

METHOD AND DEVICE FOR UPDATING A MULTIMEDIA BROADCAST CONDITIONAL ACCESS PLUG-IN

TECHNICAL FIELD

The present invention relates to the field of digital mobile multimedia broadcast conditional access (CA) technology, and more particularly relates to a method and device for updating a multimedia broadcast conditional access plug-in.

BACKGROUND

In recent years, digital mobile multimedia broadcast technologies and standards have developed rapidly, and various standards provide an end user of mobile multimedia broadcast with many service contents, for example, programs such as advertisings, weather forecasts, news, sport programs, variety shows, multimedia broadcast plays and movies. The users can choose the mobile multimedia broadcast service programs according to their own preferences.

A conditional access system (CAS) is a system for controlling the receiving of broadcast services or programs by subscribers, that is, the subscribers can only watch the entitled broadcast services or programs. The CAS is the key to achieve personalized services, and the basic purpose is to perform entitlement control and entitlement management of users in a television system, so as to realize paid services of a digital broadcast system.

The china mobile multimedia broadcasting (CMMB) system sends multimedia broadcast services in a time division multiplexing mode. The duration of a broadcast channel frame is 1 second, which is composed of 40 time slots of 25 milliseconds. One or more time slots may transmit data encapsulated in one multiplexing frame. In the multiplexing frame structure of the mobile multimedia broadcast, a multiplexing frame is divided into three parts which are a multiplexing frame header, a multiplexing frame payload and a multiplexing frame filling, as shown in FIG. 1. A mode in which control message and business data are separated is adopted for transmitting in the mobile multimedia broadcast technology. A zero multiplexing frame (MF_ID=0) is correspondingly used for encapsulating the control message when the time slot is used as a control channel, and a non-zero multiplexing frame (MF_ID!=0) is correspondingly used for encapsulating service data when the time slot is used as a data channel. For the service multiplexing frame payload, it can be divided into one or more multiplexing sub-frames, a video segment, an audio segment and a data segment are encapsulated after a sub-frame header in each sub-frame, as shown in FIG. 2.

In the front end of the CA system, a control word (CW) is encrypted into an entitlement control message (ECM) and encapsulated in a data segment of a multiplexing sub-frame; a service key (SK) is encrypted into an entitlement management message (EMM) which independently occupies one multiplexing sub-frame, and is sent to the air through channel modulation performed by a modulator. As shown in FIG. 3, the basic procedure for processing data of a terminal CA module is as follows: a multiplexing frame is obtained by signal tuning of a tuner, and an ECM, an EMM and an electronic service guide (ESG) in the multiplexing sub-frame are obtained by demultiplexing of a demultiplexer respectively; then a session description protocol (SDP) is obtained through extracting the ESG by an ESG module, and a CA database performs decryption operations using the ECM, the EMM and the SDP; finally, a control word (CW) is generated, a descrambling module descrambles the scrambled audio and video data after obtaining the CW, and clear stream data of audio and video is obtained and sent to a player to be played directly.

In the multimedia broadcast technology, a general method for updating a CA plug-in is to burn an application program containing plug-ins for a user terminal again, or just replace the plug-ins required to be updated. This method needs to face the user directly, so it can not be done automatically. If there are a large number of users, the workload will be great, which results in greatly increased costs. Therefore it is disadvantageous for the maintenance of the CA system. Especially in the CMMB system, due to the use of the broadcast mode, the terminal and the front end can not have a two-way interaction, thus limiting the security of the system to a large extent. Moreover, if the CA plug-in is not updated regularly, the security of the system may not be guaranteed. Consequently, for the security, scalability, and convenience of the system, the mobile multimedia broadcast is required to provide a device and method for updating a CA plug-in automatically.

SUMMARY

The object of the present invention is to provide a method and device for updating a multimedia broadcast conditional access plug-in, which can improve the maintainability, security and scalability of a mobile multimedia broadcast system.

An aspect of the present invention is to provide a sending method of a front end for updating a multimedia broadcast conditional access plug-in, which is adapted to a mobile multimedia broadcast system supporting function of downloading a multiplexing frame file. The method comprises the steps:

a CA plug-in file is divided into file blocks, then the file blocks are divided into file pieces, and the file pieces are encapsulated into service data packets, then the service data packets are encapsulated into data units;

a frame header is encapsulated in a multiplexing frame after the value of a "plug-in update identification" field configured in the frame header of the multiplexing frame is set to be valid, and the data unit is encapsulated in a data segment of a multiplexing sub-frame; and the encapsulated multiplexing frame is modulated to an electromagnetic wave of a physical channel, and the electromagnetic wave is sent to the air.

Further, before the CA plug-in file is divided, the method may further comprise the step: the "plug-in update identification" field may be extended and configured in the structure of the multiplexing frame header.

Further, the multiplexing frame may be sent on the electromagnetic wave using a carousel mode of broadcast.

Another aspect of the present invention is to provide a receiving method of a terminal for updating a multimedia broadcast conditional access plug-in, which is adapted to a mobile multimedia broadcast system supporting function of downloading a multiplexing frame file. The method comprises the steps:

a multiplexing frame is obtained by tuning a received electromagnetic wave signal;

a "plug-in update identification" field in the header of a multiplexing frame is obtained by demultiplexing the multiplexing frame, and when the value of the "plug-in update identification" field is determined to be valid, a data unit in a data segment of a multiplexing sub-frame is obtained by demultiplexing; and the data units are unpacked into service data packets, file pieces and file blocks in turn, and the file blocks are assembled into a complete CA plug-in file, and the CA plug-in file is downloaded to a CA database.

Further, before the CA plug-in file is downloaded to the CA database, the method may further comprise the step: when an original CA plug-in file is determined to be existent, the original CA plug-in file may be backed up; if the CA plug-in file is downloaded successfully, the backup of the original CA plug-in file may be deleted; if the CA plug-in file fails to be downloaded, the original CA plug-in file may be recovered.

Another aspect of the present invention is to provide a front end device for updating a multimedia broadcast conditional access plug-in, which is adapted to a mobile is multimedia broadcast system supporting function of downloading a multiplexing frame file. The device comprises a file server, a multiplexer, a modulator and a transmitter, which are connected in turn; wherein the file server is used to divide a CA plug-in file into file blocks, then divide the file blocks into file pieces, and encapsulate the file pieces into service data packets, then encapsulate the service data packets into data units and send the data units to the multiplexer;

the multiplexer is used to encapsulate a frame header in a multiplexing frame after the value of a "plug-in update identification" field which is extended and configured in the frame header of the multiplexing frame is set to be valid, and encapsulate the data unit in a data segment of a multiplexing sub-frame;

the modulator is used to modulate the encapsulated multiplexing frame to an electromagnetic wave of a physical channel; and the transmitter is used to send the electromagnetic wave to the air.

Further, the transmitter may send the multiplexing frame on the electromagnetic wave using a carousel mode of broadcast.

Another aspect of the present invention is to provide a terminal device for updating a multimedia broadcast conditional access plug-in, which is adapted to a mobile multimedia broadcast system supporting function of downloading a multiplexing frame file. The device comprises a tuner, a demultiplexer, and a file processing module, which are connected in turn; wherein the tuner is used to tune a received electromagnetic wave signal to obtain a multiplexing frame which is sent to the demultiplexer;

the demultiplexer is used to obtain a frame header in the multiplexing frame by demultiplexing, obtain a data unit in a data segment of a multiplexing sub-frame by demultiplexing when the value of a "plug-in update identification" field is determined to valid, and send the data unit to the file processing module; and the file processing module is used to unpack the data units into service data packets, file pieces and file blocks in turn, assemble the file blocks into a complete CA plug-in file, and download the CA plug-in file to a CA database.

Further, the file processing module may back up an original CA plug-in file when the original CA plug-in file is determined to be existent, before the CA plug-in file is downloaded to the CA database; the file processing module may delete the backup of the original CA plug-in file if the CA plug-in file is downloaded successfully, and recover the original CA plug-in file if the CA plug-in file fails to be downloaded.

Using a file transfer mechanism of the mobile multimedia broadcast system, the present invention conveniently achieves the timely updating of the CA plug-in as well as the upgrade and maintenance of the system by the automatic downloading of the CA plug-in, thus enhancing the security and scalability of the system.

BRIEF DESCRIPTION OF THE DRAWINGS

FIG. 4 illustrates an improved structure of a mobile multimedia broadcast multiplexing header according to the present invention;

DETAILED DESCRIPTION

A mobile multimedia broadcast system essentially has protocols and function of file downloading, such as, data services of a file mode and stream mode of CMMB, which are transmitted in a data segment of a multiplexing sub-frame. The present invention achieves automatic updating of a CA plug-in based on the file downloading function. Above all, the structure of a multiplexing frame header is required to be improved, i.e., a "plug-in update identification" field is configured in the multiplexing frame header.

In a front end device, a CA plug-in file is divided into file blocks and file pieces in turn by a file server, and the file pieces are encapsulated into service data packets and data units in turn; the value of the "plug-in update identification" field in the multiplexing frame header is set to be valid by a multiplexer, and the multiplexing frame header is encapsulated in the multiplexing frame, and the data unit is encapsulated in a data segment of a multiplexing sub-frame; then signal modulating is performed to the encapsulated multiplexing frame by a modulator, finally, the modulated signal is sent to the air by a transmitter.

In a terminal device, a multiplexing frame header is obtained by demultiplexing using a multiplexer after a multiplexing frame signal is received by the tuning of a tuner, and when the value of the "plug-in update identification" field in the multiplexing frame header is determined to be valid, a data unit in the data segment of the multiplexing sub-frame is obtained by demultiplexing; and the data units are unpacked into service data packets, file pieces and file blocks in turn by a file processing module, and the file blocks are assembled into a complete CA plug-in file, which is downloaded to a CA database.

The above technical solution of the present invention will be illustrated in detail hereinafter with reference to the accompanying drawings and embodiments.

FIG. 4 illustrates an improved structure of a mobile multimedia broadcast multiplexing header according to the present invention. A "plug-in update identification" field, which was originally a reserved bit, is added to the original multiplexing header. If the value of the "plug-in update identification" field is 1, it indicates that the CA plug-in file is required to be updated.

Figure 1:
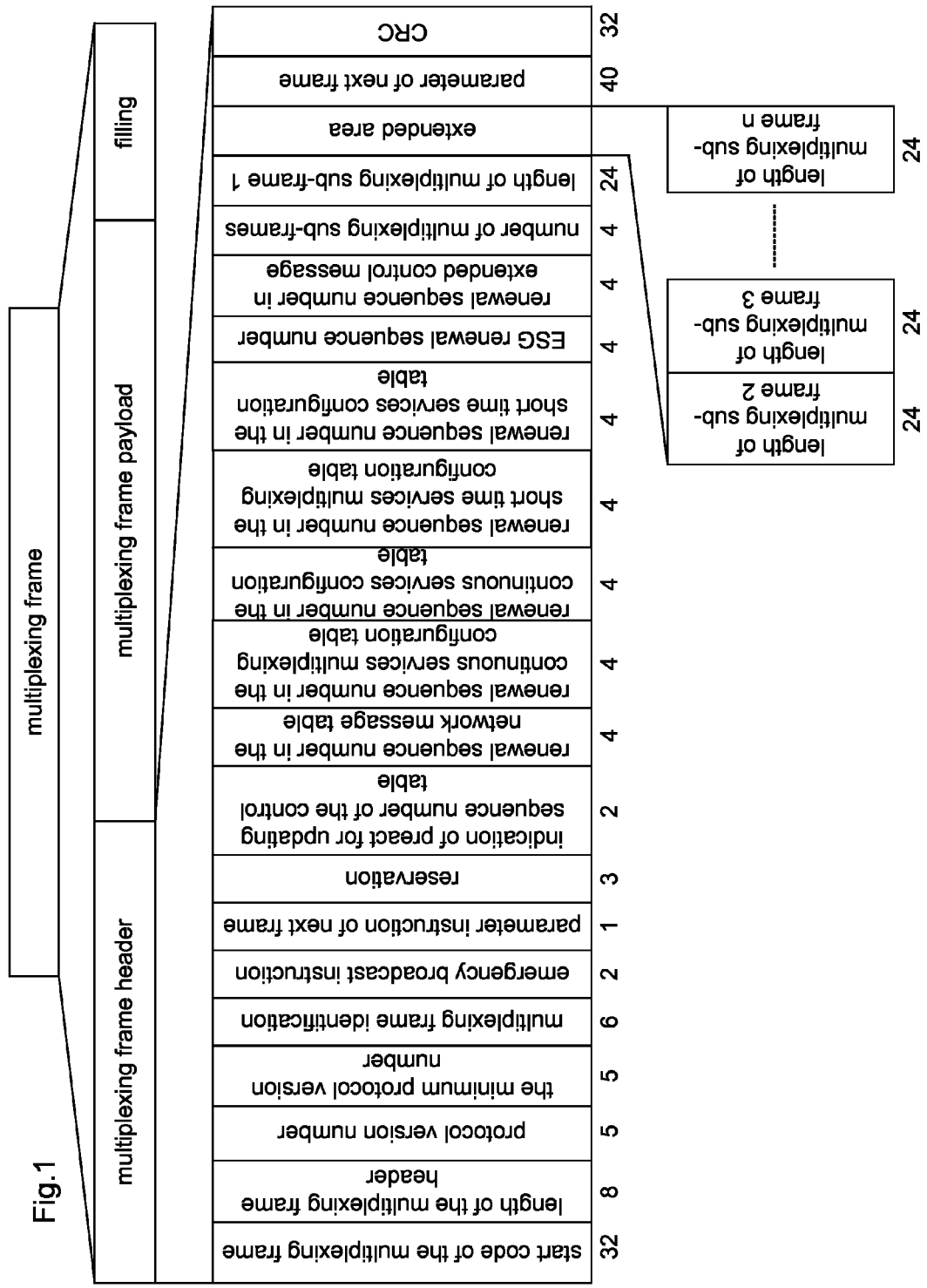
FIG. 1 illustrates structures of a mobile multimedia broadcast multiplexing frame and its multiplexing frame header.
Figure 2:
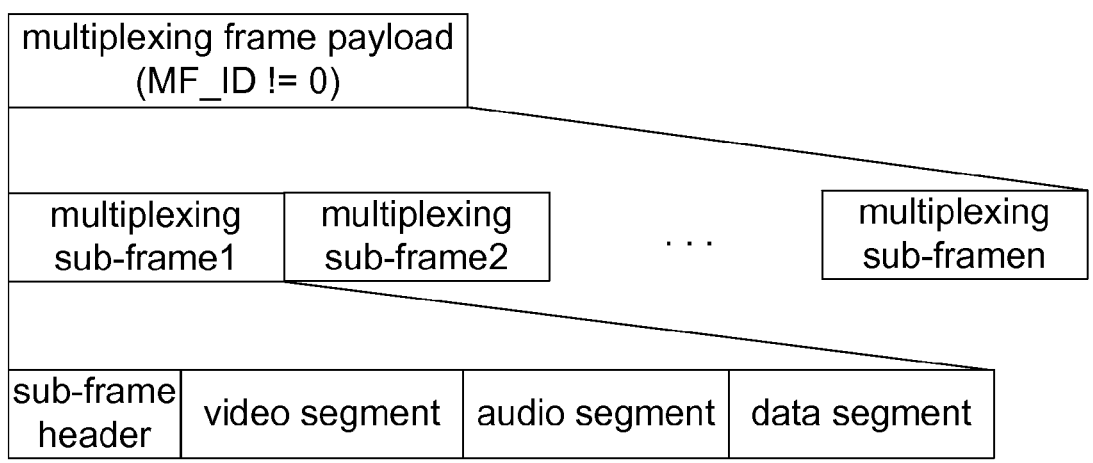
FIG. 2 illustrates a structure of a mobile multimedia broadcast multiplexing sub-frame.
Figure 3:
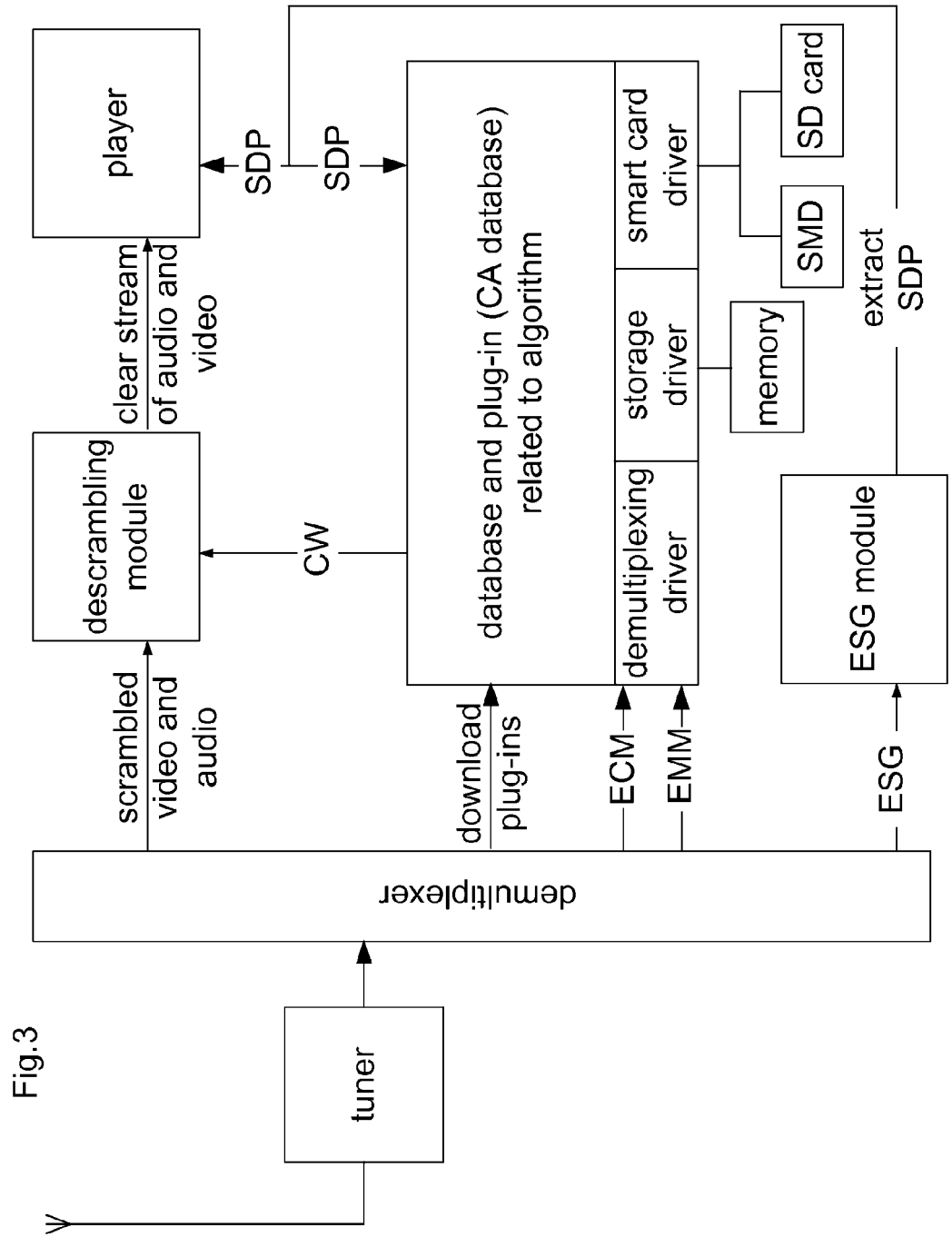
FIG. 3 is a block diagram illustrating the principle of a CA module of a mobile multimedia broadcast terminal.
Figure 5:
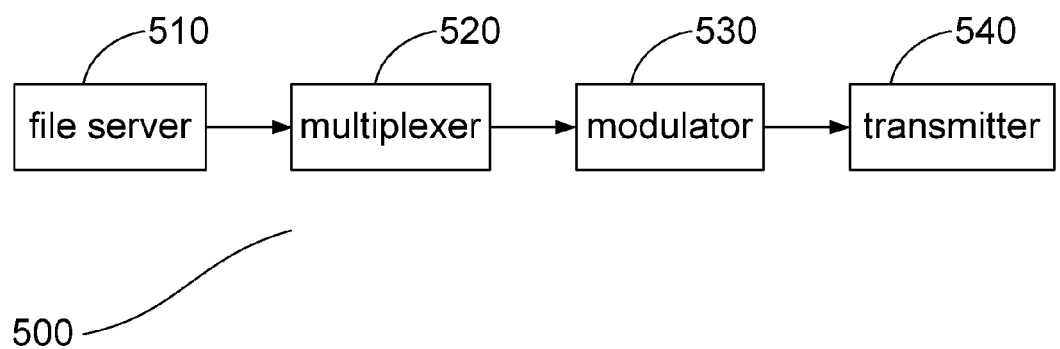
FIG. 5 is a structure block diagram illustrating a front end device for automatically updating a multimedia broadcast conditional access plug-in according to the present invention.

FIG. 5 illustrates a front end device 500 for updating a multimedia broadcast CA plug-in according to the present invention. The device 500 comprises a file server 510, a multiplexer 520, a modulator 530 and a transmitter 540, which are connected in turn.

The file server 510 is used to divide the updated CA plug-in file into file blocks, then divide the file blocks into file pieces, and encapsulate the file pieces into service data packets, then encapsulate the service data packets into data units and send the data units to the multiplexer 520.

The multiplexer 520 is used to set the value of the "plug-in update identification" field which is extended and configured in the multiplexing frame header as 1, then encapsulate the multiplexing frame header in the multiplexing frame, meanwhile, encapsulate the data unit in a data segment of the multiplexing sub-frame, then send the encapsulated multiplexing frame to the modulator 530.

The modulator 530 is used to modulate the encapsulated multiplexing frame to an electromagnetic wave of a physical channel and send the electromagnetic wave to the transmitter 540.

The transmitter 540 is used to send the electromagnetic wave carrying the encapsulated data to the air.

In order to improve the success rate of the file downloading, if a broadcast mode, for example, a data broadcast mode of CMMB, is used, the multiplexing frame data can be sent on the electromagnetic wave using a carousel mode, which is broadcasting the data repeatedly by a certain time.

Figure 6:
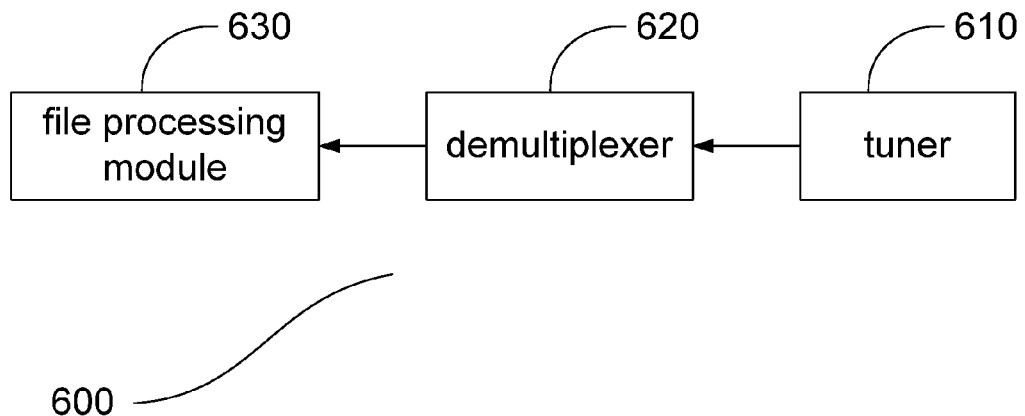
FIG. 6 is a structure block diagram illustrating a terminal device for automatically updating a multimedia broadcast conditional access plug-in according to the present invention.

FIG. 6 illustrates a terminal device 600 for updating a multimedia broadcast CA plug-in according to the present invention. The device 600 comprises a tuner 610, a demultiplexer 620 and a file processing module 630, which are connected in turn.

The tuner 610 is used to obtain a multiplexing frame by tuning a received electromagnetic wave signal, and send the multiplexing frame to the demultiplexer 620.

The demultiplexer 620 is used to obtain a multiplexing frame header by demultiplexing the input multiplexing frame, and when determining the value of the "plug-in update identification" field in the frame header is 1, demultiplex the data segment of the multiplexing sub-frame to obtain a data unit, then sent the data unit to the file processing module 630.

The file processing module 630 is used to unpack the data units into service data is packets, file pieces and file blocks in turn, then assemble the file blocks into a complete CA plug-in file, and download the CA plug-in file to a CA database.

The file processing module 630 backs up the original CA plug-in file, when determining it exists (for example, determining according to file names), before the CA plug-in file is downloaded. If the CA plug-in file is downloaded successfully, the file processing module 630 deletes the backup of the original CA plug-in file; if not, the file processing module 630 recovers the original CA plug-in file.

Figure 7:
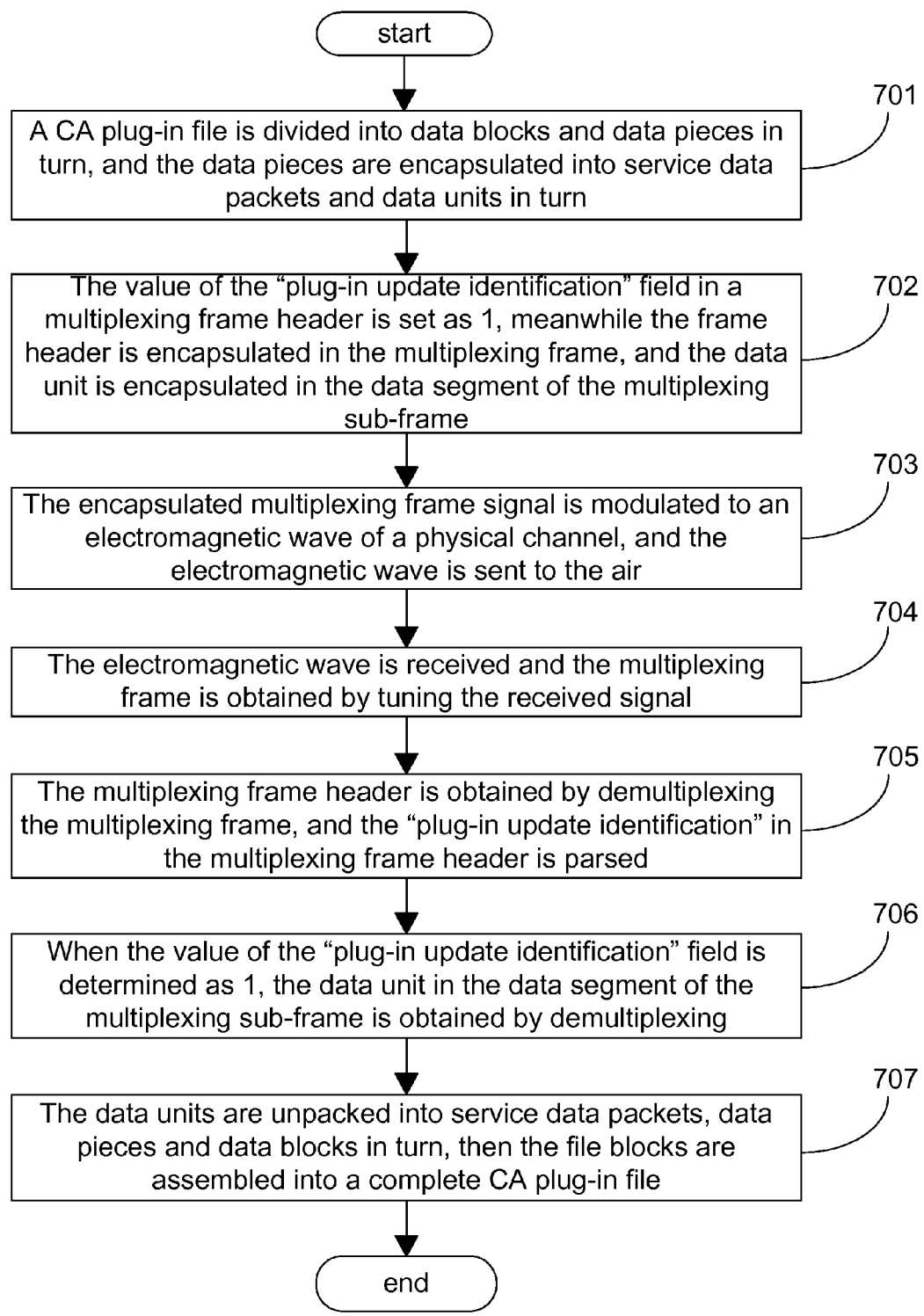
FIG. 7 illustrates processing procedures of a front end and terminal for automatically updating a multimedia broadcast conditional access plug-in according to the present invention.

FIG. 7 illustrates a flowchart of a method for updating a multimedia broadcast conditional access plug-in according to an embodiment of the present invention. The method includes the sending procedure of a front end and the receiving procedure of a terminal end.

The sending procedure of the front end includes the following steps.

Step 701: A CA plug-in file is divided into file blocks, the file blocks are divided into file pieces, and the file pieces are encapsulated into service data packets, then the service data packets are encapsulated into data units.

Step 702: The value of the "plug-in update identification" field which is extended and configured in the multiplexing frame header is set as 1, then the multiplexing frame header are encapsulated in the multiplexing frame, and the data unit is encapsulated in a data segment of the multiplexing sub-frame.

Step 703: The encapsulated multiplexing frame is modulated to an electromagnetic wave of a physical channel, and the electromagnetic wave is sent to the air.

In order to improve the success rate of the file downloading, the multiplexing frame can be sent on the electromagnetic wave using a carousel mode of broadcast.

The receiving procedure of the terminal end includes the following steps.

Step 704: A multiplexing frame is obtained by tuning a received electromagnetic wave signal.

Step 705: The "plug-in update identification" field is obtained by demultiplexing the multiplexing frame header in the multiplexing frame.

Step 706: When the value of the "plug-in update identification" field in the multiplexing frame header is determined as 1, a data unit in the data segment of the multiplexing sub-frame is obtained by demultiplexing.

Step 707: The data units are unpacked into service data packets, file pieces and file blocks in turn, then the file blocks are assembled into a complete CA plug-in file, and the CA plug-in file is downloaded to a CA database.

Before the CA plug-in file is downloaded, the original CA plug-in file is backed up if the original CA plug-in file is determined to be existent. If the file is downloaded successfully, the backup of the CA plug-in is deleted, if not, the original CA plug-in is recovered.

The premise for the implementing the above procedures is that a "plug-in update identification" field is extended and configured in the multiplexing frame header of the original mobile multimedia broadcast.

In conclusion, it can be seen that the present invention conveniently achieves the automatic downloading of the CA plug-in by the file transfer mechanism of the mobile multimedia broadcast system, thus helping the upgrade and maintenance of the CA system and enhancing the maintainability, security and scalability of the system.

Of course, the present invention may also has a variety of other embodiments, to those skilled in the art, various corresponding modifications and changes can be made according to the present invention, without departing from the sprit and substances of the present invention. However, these corresponding modifications and changes shall be included in the protection scope of the claims appended in the present invention.

INDUSTRIAL APPLICABILITY

The present invention helps the upgrade and maintenance of the multimedia broadcast CA system and enhances the maintainability, security and scalability of the system.

What is claimed is:

1. A sending method of a front end for updating a multimedia broadcast conditional access (CA) plug-in, which is adapted to a mobile multimedia broadcast system supporting function of downloading a multiplexing frame file, comprising:

dividing a CA plug-in file into file blocks, then dividing the file blocks into file pieces, and encapsulating the file pieces into service data packets, then encapsulating the service data packets into data units;

encapsulating a frame header in a multiplexing frame after the value of a "plug-in update identification" field configured in the frame header of the multiplexing frame is set to be valid, and encapsulating the data unit in a data segment of a multiplexing sub-frame; and modulating the encapsulated multiplexing frame to an electromagnetic wave of a is physical channel, and sending the electromagnetic wave to the air.

2. The method according to claim 1, before dividing the CA plug-in file, the method further comprising:

extending and configuring the "plug-in update identification" field in the structure of the multiplexing frame header.

3. The method according to claim 1, wherein the multiplexing frame is sent on the electromagnetic wave using a carousel mode of broadcast.

4. A receiving method of a terminal for updating a multimedia broadcast conditional access plug-in, which is adapted to a mobile multimedia broadcast system supporting function of downloading a multiplexing frame file, comprising:

obtaining a multiplexing frame by tuning a received electromagnetic wave signal;

obtaining a "plug-in update identification" field in the header of a multiplexing frame by demultiplexing the multiplexing frame, and when determining the value of the "plug-in update identification" field is valid, obtaining a data unit in a data segment of a multiplexing sub-frame by demultiplexing; and unpacking the data units into service data packets, file pieces and file blocks in turn, and assembling the file blocks into a complete CA plug-in file, and downloading the CA plug-in file to a CA database.

5. The method according to claim 4, before downloading the CA plug-in file to the CA database, the method further comprising:

when determining an original CA plug-in file exists, backing up the original CA plug-in file; if the CA plug-in file is downloaded successfully, deleting the backup of the original CA plug-in file; if the CA plug-in file fails to be downloaded, recovering the original CA plug-in file.

6. A front end device for updating a multimedia broadcast conditional access plug-in, which is adapted to a mobile multimedia broadcast system supporting function of downloading a multiplexing frame file, the device comprising a file server, a multiplexer, a modulator and a transmitter, which are connected in turn; wherein the file server is used to divide a CA plug-in file into file blocks, then divide the file is blocks into file pieces, and encapsulate the file pieces into service data packets, then encapsulate the service data packets into data units and send the data units to the multiplexer;

the multiplexer is used to encapsulate a frame header in a multiplexing frame after the value of a "plug-in update identification" field which is extended and configured in the frame header of the multiplexing frame is set to be valid, and encapsulate the data unit in a data segment of a multiplexing sub-frame;

the modulator is used to modulate the encapsulated multiplexing frame to an electromagnetic wave of a physical channel; and the transmitter is used to send the electromagnetic wave to the air.

7. The device according to claim 6, wherein the transmitter sends the multiplexing frame on the electromagnetic wave using a carousel mode of broadcast.

8. A terminal device for updating a multimedia broadcast conditional access plug-in, which is adapted to a mobile multimedia broadcast system supporting function of downloading a multiplexing frame file, the device comprising a tuner, a demultiplexer and a file processing module, which are connected in turn; wherein the tuner is used to tune a received electromagnetic wave signal to obtain a multiplexing frame which is sent to the demultiplexer;

the demultiplexer is used to obtain a frame header in the multiplexing frame by demultiplexing, obtain a data unit in a data segment of a multiplexing sub-frame by demultiplexing when the value of a "plug-in update identification" field is determined to be valid, and send the data unit to the file processing module; and the file processing module is used to unpack the data units into service data packets, file pieces and file blocks in turn, assemble the file blocks into a complete CA plug-in file, and download the CA plug-in file to a CA database.

9. The device according to claim 8, wherein the file processing module backs up an original CA plug-in file when the original CA plug-in file is determined to be existent, before the CA plug-in file is downloaded to the CA database; the file processing module deletes the backup of the original CA plug-in file if the CA plug-in file is downloaded successfully, and recovers the original CA plug-in is file if the CA plug-in file fails to be downloaded.

10. The method according to claim 2, wherein the multiplexing frame is sent on the electromagnetic wave using a carousel mode of broadcast.

* * * * *

UNITED STATES PATENT AND TRADEMARK OFFICE
CERTIFICATE OF CORRECTION

PATENT NO. : 8,411,686 B2
APPLICATION NO. : 12/990946
DATED : April 2, 2013
INVENTOR(S) : Fu Wei Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 317 days.

Signed and Sealed this
First Day of September, 2015

Michelle K. Lee
*Director of the United States Patent and Trademark Office*